United States Patent Office 3,183,207
Patented May 11, 1965

3,183,207
VINYL HALIDE POLYMERS AND COPOLYMERS AND IMIDAZOLINE-METALLIC CURING SYSTEM THEREFOR
Melvin Nimoy, Hyde Park, Elizabeth C. Dearborn, Boston, and Philip K. Isaacs, Brookline, Mass., assignors to W. R. Grace & Co., Cambridge, Mass., a corporation of Connecticut
No Drawing. Filed Oct. 11, 1960, Ser. No. 61,831
21 Claims. (Cl. 260—41)

This invention relates to halogenated polymers and in particular to thermosetting vinyl halide polymers having improved solvent resistance and adhesive properties. The polymeric materials to which this invention is particularly suitable include homopolymers and copolymers of vinyl halides such as vinyl chloride, vinylidene chloride or vinylidene fluoride. Comonomers that may be copolymerized with such vinyl halides include vinyl esters of carboxylic acids such as vinyl acetate, vinyl propionate, vinyl stearate and vinyl benzoate, acrylate and methacrylate esters, maleic esters, acrylonitrile; and hexafluoropropene.

Vinyl polymers are versatile materials responding to many uses and are available in plasticized or unplasticized form. The unplasticized or rigid resins are prepared to take maximum advantage of their excellent chemical resistance. Most uses, however, require modification of the polymers by the addition of plasticizers, filler, and pigments to give them desirable properties for specific commercial applications and for processing. Plasticizers play an important role in modifying these resins to meet a wide variety of requirements.

Modification of the original polymer by the addition of processing aids or other additives frequently adversely affects its chemical resistance. In addition, a principal deficiency of many of these polymers, particularly the chlorinated types, is their poor thermal stability. When heated at about 100° C., such polymers soften considerably because of their thermoplastic nature. This factor obviously precludes their use at higher temperatures. Polyvinyl chloride, the most widely used of this class, suffers from the added drawback of requiring a large amount of plasticizer for most applications. Frequently, the plasticizer bleeds out and is extracted by oils and solvents.

It is, therefore, a principal object of this invention to provide modified vinyl halide polymers which overcome the foregoing disadvantages. These polymers consist of a halogenated polymeric material, an imidazoline as a curing agent, and certain metallic compounds which regulate the curing action of the imidazoline. In addition, conventional plasticizers, fillers and other additives may be incorporated depending on the end use to which the polymers are put. They may be processed by extrusion, calendering, molding, plastisol or organosol application, powder sintering or other standard fabricating techniques. The cured polymers may be characterized as thermosetting resins which adhere well to many surfaces.

Imidazolines are highly effective curing agents for halogenated polymers. The use of these imidazolines alone, however, has definite disadvantages when added to certain vinyl polymer systems, such as paste grade polyvinyl chloride plasticized with dioctyl phthalate. For example a disadvantage is that the product blackens, stiffens and evolves HCl on heating, and it is difficult to obtain a high degree of crosslinking without encountering these signs of degradation. This invention provides a means of preventing these side effects while maintaining the advantages of imidazoline cure. In addition, solvent resistance is improved coupled with increased crosslinking while at the same time imparting adhesive properties to the polymeric material.

It has been discovered that certain classes of metal compounds will regulate the curing action of imidazolines on polyvinyl halides and produce unexpected improvements in the properties of the polymer. These metallic materials have a very specific action on polyvinyl halide-imidazoline combinations compared to any other inorganic additive. They simultaneously retard blackening on heating, prevent gas evolution, prevent exudation of plasticizer, improve adhesion to many surfaces, and augment resistance to water. Their action on polyvinyl chloride, for example, is entirely different from the well known stabilizing action of metal soaps. Many materials which perform well in the present system will accelerate the degradation of unvulcanized polyvinyl chloride compositions. Contrariwise, materials which normally control polyvinyl chloride degradation have no effect in this system. Another aspect of this invention is that these same metallic compounds will enhance the imidazoline-induced crosslinking of highly halogenated polymers (i.e., those with two or more halogens for every two carbon atoms), and at the same time control degradation.

The class of metallic compounds which are operable in this invention are the oxides, sulfides and salts of metals of group IIB and IVA of the periodic table of elements. The specific metals are zinc, cadmium, mercury, and lead and the compounds of these metals are limited to those which are soluble in ammonium salts or ammonia solutions and form ammonia complexes. The metallic compounds should preferably be in a finely divided state so as to present adequate surface for reaction and a particle size of about .5 micron or less has been found effective. While certain compounds will perform one or two of the three desirable functions, i.e., delayed blackening, better adhesion or less exudation, such materials do not fall in the operable general class described above.

The imidazolines most useful in the practice of this invention may be defined as 2-substituted-2-imidazoline or 1,2-disubstituted-2-imidazoline having the structure:

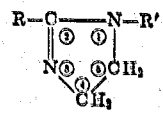

where R represents an aliphatic group containing 1 to 36 carbon atoms and R' may be hydrogen, or the group

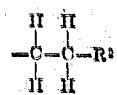

where R² may be hydrogen, hydroxyl, NH₂, or a chain containing aliphatic ester groups, other 2-substituted-2-imidazoline or 1,2-disubstituted-2-imidazoline groups, aliphatic amido groups, aliphatic amino groups or a combination of such groups. This definition is intended to include as equivalents such compounds where either or both of the 4 or 5 carbon atoms on the imidazoline ring are substituted with a lower alkyl group such as methyl or ethyl.

The preferred imidazolines for use in this invention are those which in themselves are non-volatile and chemically stable at curing temperatures. In addition, they should be such that the uncured mixture with halogenated polymer undergoes no change with time or is relatively unaffected by atmospheric moisture. The low molecular weight imidazolines, such as lysidine, are effective curing agents but tend to form fumes at curing temperatures and hydrolyze at room temperature when exposed to moist air. Other imidazolines, such as octamethylene diimidazoline, are high melting crystalline solids that are difficult to incorporate uniformly in the polymer composition and have limited compatability with some halogenated polymers. The most useful of the imidazoline structures from these points of view are the reaction products of fat-derived acids with diethylene triamine or the higher polyethylene amines.

The halogenated polymers useful in the practice of this invention are commercially available or they can be readily prepared. They include vinyl halide polymers and copolymers, either paste grade, solution grade, or extrusion grade.

The invention is further illustrated by the following examples. Proportions, here and elsewhere, herein are expressed as percentages and parts by weight. To simplify the presentation, the structure of the particular imidazolines used in the examples are reproduced and designated as follows:

IMIDAZOLINE I

This imidazoline was prepared by reacting two moles of oleic acid and one mole of sebacic acid with two moles of triethylene tetramine. The reaction was carried out for 4 hours at 150° C.–220° C. at 760–15 mm. of pressure in a nitrogen atmosphere accompanied with vigorous agitation. The product is a mixture of imidazolines in which the following postulated structure is believed to predominate.

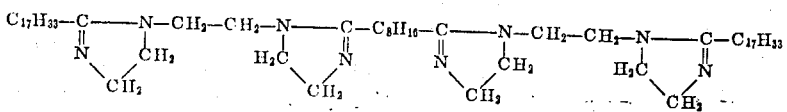

IMIDAZOLINE II

Imidazoline II was prepared in glass-lined equipment in an atmosphere of nitrogen in three steps in which the reactants were vigorously agitated in each step. In the first step, two moles of each of oleic acid and triethylene tetramine were reacted for 4 hours at 150° C.–220° C. in a vacuum of 150 to 50 mm. Hg. In the second step, azelaic acid and diethylene glycol were separately reacted in a molar ratio of 2.4:1.8 for 6 hours at 125° C.–200° C. and a vacuum of 760 to 27 mm. Hg. The final product was obtained in step 3 which involved reacting 3.5 parts by weight of the reaction product of step 1 and 2.8 parts by weight of the reaction product of step 2. Step 3 was carried out at 140° C.–240° C. and a constant vacuum of 20 mm. Hg over a 4-hour period. The distillate was collected in a trap and recovered. The total distillate corresponded with substantially complete reaction as postulated, giving predominantly an imidazoline having the following structure:

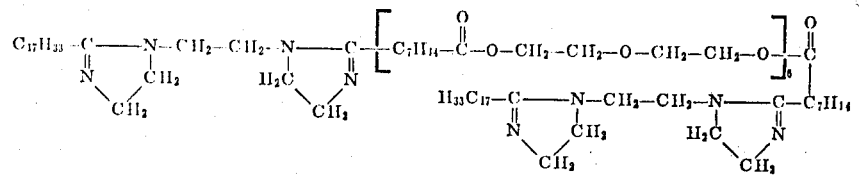

IMIDAZOLINE III

This compound was prepared by reacting equimolar amounts of acetic acid and triethylene tetramine for 4 hours at 150° C.–200° C. and 760–50 mm. of pressure in an atmosphere of nitrogen. The reactants were vigorously agitated throughout the reaction period. This yielded a mixture of products in which the imidazoline having the following structure predominated:

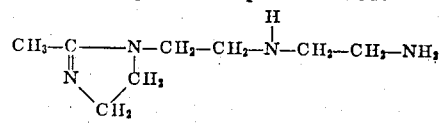

Example 1

2 parts of imidazoline I, 5 parts of Santicizer E–15 (ethyl phthalyl ethyl glycolate) and 5 parts of Saran F242 (copolymer consisting of 90% vinylidene chloride and 10% acrylonitrile) were mixed together and designated as Sample A. Sample B was prepared and consisted of like proportions of the same components but additionally contained 2 parts of zinc oxide. Properties of each sample were as follows:

| | Sample A | Sample B |
|---|---|---|
| Initial viscosity at 25° C | Pasty | Pasty. |
| 24 HOURS AT 25° C. | | |
| Color | Dark brown | Light tan. |
| Consistency | Slightly more viscous. | Rubbery solid. |
| Soluble in cyclohexanone | Yes | No. |
| Adhesion to aluminum | Remained liquid | Excellent. |
| 10 MIN. CURE AT 100° C. | | |
| Color | Black | Light brown. |
| Consistency | Viscous fluid | Rubbery solid. |
| Soluble in cyclohexanone | Yes | No. |
| Adhesion to aluminum | Remained liquid | Excellent. |

The foregoing results show that zinc oxide not only prevents darkening and degradation, but it also promotes crosslinking of vinylidene chloride copolymers at low temperatures. The properties of Sample B make it useful as a two-component, 100% solids sealing material for building construction.

Example 2

This example shows that absence of a metallic compound in a polymeric system yields an inferior product and it further shows that certain metallic compounds are superior to others under certain conditions. Three samples were prepared as follows:

| Component | Sample (parts by weight) | | |
|---|---|---|---|
| | A | B | C |
| Geon 121 (paste grade polyvinyl chloride) | 100 | 100 | 100. |
| Imidazoline II | 100 | 100 | 100. |
| Zinc oxide | | 20 | |
| Lead oxide ($Pb_3O_4$) | | | 20. |

5 MIN. CURE AT 200° C.

| | | | |
|---|---|---|---|
| Color | Dark brown | Tan | Red. |
| Soluble in cyclohexanone | No | No | No. |
| Properties | Flexible, tough | Flexible, tough | Flexible, tough. |

30 MIN. CURE AT 200° C.

| | | | |
|---|---|---|---|
| Color | Black | Dark brown | Red. |
| Soluble in cyclohexanone | No | No | No. |
| Properties | Brittle, oily | Hard, slightly brittle | Hard, but flexible. |

60 MIN. CURE AT 200° C.

| | | | |
|---|---|---|---|
| Color | Black | Black | Dark red. |
| Soluble in cyclohexanone | No | No | No. |
| Properties | Curled, brittle, oily exudate | Brittle, exudate | Hard, not brittle, no exudate. |

It is noted that Sample A, which contained no metallic compound, blackened at the 30-minute cure. Lead oxide, on the other hand, is seen superior to zinc oxide for long term heat resistance of imidazoline-cured vinyl halide systems.

*Example 3*

This example shows that fluorinated polymers of structure similar to the vinylidene chloride copolymers react similarly with the metallic compound in the presence of imidazolines. Two samples were prepared: one with the metallic compound; the other without.

| Component | Sample (parts by weight) | |
|---|---|---|
| | A | B |
| Viton A (copolymer of vinylidene fluoride and hexafluoropropene) | 100 | 100. |
| Imidazoline I | 5 | 5. |
| Zinc oxide | 0 | 5. |

5 MINUTE CURE AT 200° C.

| | | |
|---|---|---|
| Color | Dark brown | Light brown |
| Properties | Rubbery | Rubbery. |
| Swelling value in methyl ethyl ketone | 9.8 | 10.5. |

15 MINUTE CURE AT 200° C.

| | | |
|---|---|---|
| Color | Black | Brown. |
| Properties | Weak, HF bubbles | Rubbery. |
| Swelling value in methyl ethyl ketone | 10 | 6.8. |

The curing action of sample B is enhanced as evidenced by the lower swelling value at the 15-minute cure and degradation is retarded. The product is useful as a resistant gasketing material.

The following Examples 4 and 5 show the effect of using various metal compounds in stabilizing polyvinyl chloride and a vinyl chloride copolymer.

*Example 4*

A specific formulation was prepared by mixing 10 parts of Imidazoline III, 40 parts of dioctyl phthalate and 50 parts of Pliovic AO (a copolymer consisting of 93% vinyl chloride and 7% dibutyl maleate, supplied by Goodyear Tire and Rubber Co.). The following additives were thereafter added at a 20% level into separate formulations of like proportions. The results of such addition are reported as follows:

| Additive | Time to crosslink at 200° C. (minutes) | Time to degrade at 200° C. (minutes) |
|---|---|---|
| None | 2 | 5 |
| ZnO | 2 | 20+ |
| CdS | 2 | 20+ |
| $Hg_2SO_4$ | 2 | 10 |
| $PbSO_4$ | 2 | 10 |
| $PbO_2$ | 2 | 20 |

It is noted that zinc oxide and cadmium sulfide gave the best results while lead dioxide was almost as good. The difference may be related to the lower atomic weight of the zinc and cadmium compounds.

*Example 5*

A formulation was prepared consisting of 10 parts of Imidazoline I, 100 parts of Geon 121 and 60 parts of dioctyl phthalate. The following additives were then added into separate formulations of like proportions and in the percentages indicated. The effect of time to crosslink and to degrade each such addition is tabulated below.

| Additive | Percent addition | Time to crosslink at 200° C. (minutes) | Time to degrade 200° C. (minutes)* |
|---|---|---|---|
| None | | 2 | 5 |
| ZnO | 5 | 2 | 10 |
| ZnO | 20 | 2 | 10 |
| $ZnSO_4$ | 5 | 2 | 10 |
| $ZnSO_4$ | 20 | 2 | 10 |
| CdO | 5 | 2 | 10 |
| CdO | 20 | 2 | 20+ |
| CdS | 5 | 2 | 5 |
| CdS | 20 | 2 | 20+ |
| HgCl | 5 | 2 | 5 |
| HgCl | 20 | 2 | 20+ |
| HgO | 5 | 2 | 10 |
| HgO | 20 | 2 | 10 |
| $PbCrO_4$ | 5 | 2 | 5 |
| $PbCrO_4$ | 20 | 2 | 10 |
| $Pb_3O_4$ | 5 | 2 | 10 |
| $Pb_3O_4$ | 20 | 2 | 20+ |
| Dibutyltin maleate | 5 | 5 | 5 |
| Do | 20 | 20+ | 20 |

*Degradation is evidenced by blackening, bubbling and stiffening.

The data show that certain compounds of zinc, cadmium, mercury and lead function as suitable stabilizers for the imidazoline-polyvinyl chloride systems. Of significance is the fact that lead oxide is a better stabilizer than lead chromate.

The results with the mercury compounds are difficult to interpret. Both HgCl and HgO are known to interact with ammonium compounds, but the reactions are so complex that the superiority of HgCl over HgO is not unexpected.

Of particular significance is that dibutyltin maleate, which is a well known stabilizer for polyvinyl chloride, did not stabilize at the 5% level and at the 20% level it prevented crosslinking.

While the mechanism involved in this invention is not thoroughly understood, it is believed that several reactions take place upon curing the mixture of polymer, imidazoline and metallic compound. The initial heating of imidazoline and polyvinyl halide leads to formation of free radicals. These in turn attack the sites of chain branching (being the weakest points) of the polyvinyl halide and start extracting hydrogen halide which would normally lead to degradation of the polymer on continued heating. The zinc, cadmium, mercury or lead compounds become partially solubilized by the imidazoline on heating in the presence of the polymer. The metal then extracts the highly labile halogen at or near the branch site, fortifying it against attack by the free radicals produced in the initial heating step. The degradative process is thus halted, allowing both imidazoline and free radicals to crosslink readily, and preventing degradative by-products from exuding to the polymer surface which would destroy any adhesive bond that may have ben formed. The imidazoline, having chemically grafted to the polyvinyl halide, can now act as a "solid wetting agent" to anchor the polymer to a metal or other surface to which adhesion is normally difficult. Long chain 2-substituted-2-imidazolines and 1,2-disubstituted-2-imidazolines are strongly polar, possess high surface activity and are attracted to many surfaces.

In the case of polyvinylidene polymers, the free radical crosslinking cannot proceed to a great extent because there are no

groups (where X both here and in the following formula represents a halogen atom) that are most readily attacked. Here, metals are needed to extract allylic halogens to make crosslinks. The mechanism may be postulated as follows:

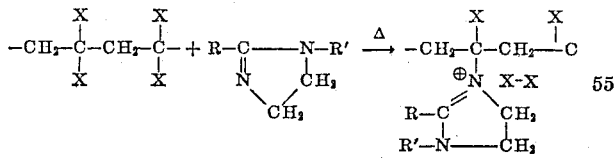

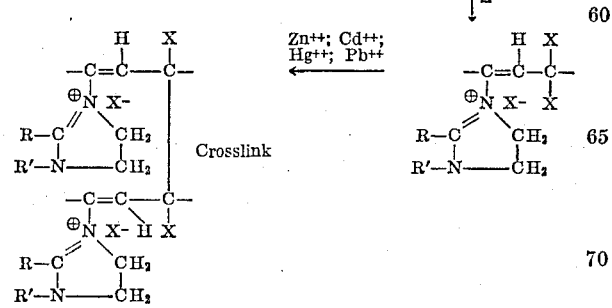

Thus, both imidazoline and metal are needed for extensive crosslinking of such structure without causing degradation.

The ratios of imidazoline, metallic compound and halogenated polymer may be varied depending upon the type of processing to be used, e.g., plastisol, organosol, extrusion, molding, calendering and the properties desired. In general, the imidazoline should constitute not less than .5 and not more than 50 parts of the final composition; the metallic compound should be not less than .5 and not more than 50 parts. The preferred ranges are 5 to 10 parts imidazoline and 1 to 20 parts metallic compound. Conventional plasticizers may be added to the extent of about 5 to 30% by weight of the final composition. Suitable plasticizers include dioctyl phthalate, dibutyl phthalate, tricresyl phosphate, dicapryl phthalate, dioctyl azelate, dioctyl adipate, etc. Curing of the composition is generally effected by heating at about 150 to 210° C. for about 20 to 1 minutes, preferably 180 to 200° C. for 10 to 3 minutes.

We claim:
1. A thermosettable composition comprising a vinyl halide polymer, an imidazoline having the structure:

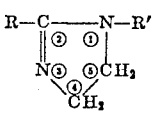

where R represents an aliphatic group containing 1 to 36 carbon atoms and R' is a member of the group consisting of hydrogen and the group

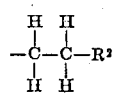

where $R^2$ is a member of the group consisting of hydrogen, hydroxyl, $NH_2$, a chain containing aliphatic ester groups, aliphatic amido groups, aliphatic amino groups, and an imidazoline ring having the structure as defined hereabove, and a metal compound which is characterized by its ability to form ammonia complexes and selected from the group consisting of an oxide, sulfide and salt of zinc, cadmium, mercury and lead.

2. A composition according to claim 1 wherein the metal compound is a compound of zinc.

3. A composition according to claim 1 wherein the metal compound is a compound of cadmium.

4. A composition according to claim 1 wherein the metal compound is a compound of mercury.

5. A composition according to claim 1 wherein the metal compound is a compound of lead.

6. A thermosettable composition comprising a vinyl halide polymer, 0.5 to 50 parts of an imidazoline having the structure:

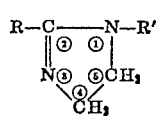

where R represents an aliphatic group containing 1 to 36 carbon atoms and R' is a member of the group consisting of hydrogen and the group

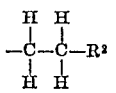

where $R^2$ is a member of the group consisting of hydrogen, hydroxyl, $NH_2$, a chain containing aliphatic ester groups, aliphatic amido groups, aliphatic amino groups, and an imidazoline ring having the structure as defined hereabove, and 0.5 to 50 parts of a metal compound which is characterized by its ability to form ammonia complexes and selected from the group consisting of an oxide, sulfide and salt of zinc, cadmium, mercury and lead.

7. A thermoset polymer obtained by heating the composition of claim 6 to a curing temperature.

8. A thermosettable composition comprising a vinyl halide polymer, 5 to 30 parts of a plasticizer, .5 to 50 parts of an imidazoline having the structure:

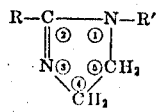

where R represents an aliphatic group containing 1 to 36 carbon atoms and R' is a member of the group consisting of hydrogen and the group

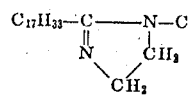

where R² is a member of the group consisting of hydrogen, hydroxyl, NH₂, a chain containing aliphatic ester groups, aliphatic amido groups, aliphatic amino groups, and an imidazoline ring having the structure as defined hereabove, and .5 to 50 parts of a metal compound which is characterized by its ability to form ammonia complexes and selected from the group consisting of an oxide, sulfide and salt of zinc, cadmium, mercury and lead.

9. A thermosettable composition comprising a polymeric material selected from the group consisting of polymers and copolymers of vinyl chloride, vinylidene chloride and vinylidene fluoride, .5 to 50 parts of an imidazoline having the structure:

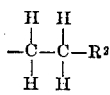

where R represents an aliphatic group containing 1 to 36 carbon atoms and R' is a member of the group consisting of hydrogen and the group

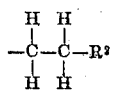

where R²is a member of the group consisting of hydrogen, hydroxyl, NH₂, a chain containing aliphatic ester groups, aliphatic amido groups, aliphatic amino groups, and an imidazoline ring having the structure as defined hereabove, and .5 to 50 parts of a metal compound which is characterized by its ability to form ammonia complexes and selected from the group consisting of an oxide, sulfide and salt of zinc, cadmium, mercury, and lead.

10. A thermosettable composition comprising 5 parts of a copolymer of vinylidene chloride and acrylonitrile, 5 parts of plasticizer, 2 parts of zinc oxide, and 2 parts of an imidazoline having the predominant structure

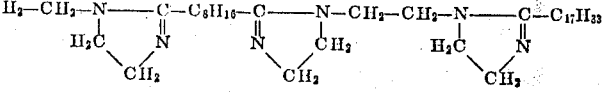

said imidazoline being prepared by reacting two moles of oleic acid, one mole of sebacic acid and two moles of triethylene tetramine.

11. A thermoset polymer obtained by heating the composition of claim 10 for about 10 minutes at about 100° C.

12. A thermosettable composition comprising 5 parts of polyvinyl chloride, 1 part of zinc oxide and 5 parts of an imidazoline having the predominant structure

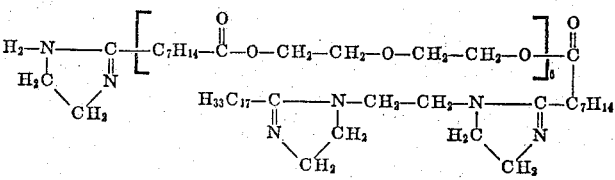

said mixture being prepared by separately reacting (1) equimolar ratios of oleic acid and triethylene tetramine, (2) 2.4 moles of azelaic acid and 1.8 moles of diethylene glycol, and (3) reacting 3.5 parts by weight of the product of reaction (1) and 2.8 parts by weight of the product of reaction (2).

13. A thermoset polymer obtained by heating the composition of claim 12 for about 5 to 30 minutes at about 200° C.

14. A thermosettable composition comprising 5 parts of polyvinyl chloride, 1 part of Pb₃O₄ and 5 parts of an imidazoline having the predominant structure

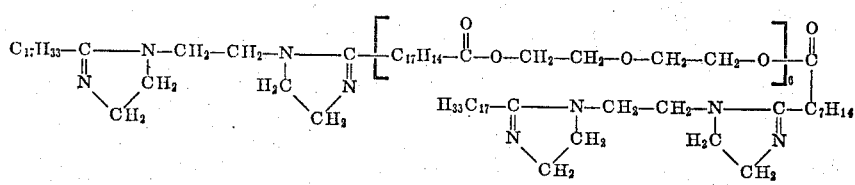

said mixture being prepared by separately reacting (1) equimolar ratios of oleic acid and triethylene tetramine (2) 2.4 moles of azelaic acid and 1.8 moles of diethylene glycol, and (3) reacting 3.5 parts by weight of the product of reaction (1) and 2.8 parts by weight of the product of reaction (2).

15. A thermoset polymer obtained by heating the composition of claim 14 for about 5 to 60 minutes at about 200° C.

16. A thermosettable composition comprising 20 parts of a copolymer of vinylidene fluoride and hexafluoropropene, 1 part of zinc oxide and 1 part of an imidazoline having the predominant structure

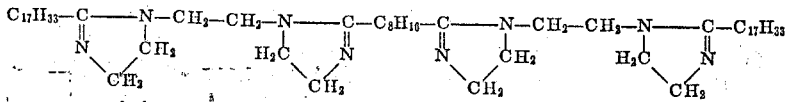

said imidazoline being prepared by reacting two moles of oleic acid, one mole of sebacic acid and two moles of triethylene tetramine.

17. A thermoset polymer obtained by heating the composition of claim 16 for about 5 to 15 minutes at about 200° C.

18. A thermosettable composition comprising 5 parts of a copolymer of vinyl chloride and vinyl acetate, 4 parts of plasticizer, 2 parts of a metal compound which is characterized by its ability to form ammonia complexes and selected from the group consisting of an oxide, sulfide and salt of zinc, cadmium, mercury, and lead, and an imidazoline having the predominant structure

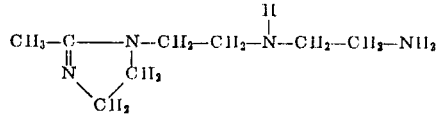

said imidazoline being prepared by reacting equimolar amounts of acetic acid and triethylene tetramine.

19. A thermoset polymer obtained by heating the compostion of claim 18 for about 10 to 20 minutes at about 200° C.

20. A thermosettable composition comprising 10 parts of polyvinyl chloride, 6 parts of plasticizer, about 5 to 20 parts of a metal compound which is characterized by its ability to form ammonia complexes and selected from the group consisting of an oxide, sulfide and salt of zinc, cadmium, mercury, and lead, and an imidazoline having the predominant structure

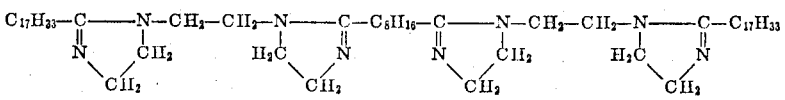

said imidazoline being prepared by reacting two moles of oleic acid, one mole of sebacic acid and two moles of triethylene tetramine.

21. A thermoset polymer obtained by heating the composition of claim 20 for about 2 to 20 minutes at about 200° C.

References Cited by the Examiner

UNITED STATES PATENTS

| | | | |
|---|---|---|---|
| 2,476,832 | 7/49 | Donia | 260—92.8 |
| 3,017,379 | 1/62 | Feild | 260—41 |
| 3,050,527 | 8/62 | Dearborn et al. | 260—92.8 |
| 3,050,528 | 8/62 | Dearborn et al. | 260—92.8 |
| 3,050,529 | 8/62 | Dearborn et al. | 260—92.8 |
| 3,093,655 | 6/63 | Dearborn et al. | 260—92.8 |

OTHER REFERENCES

Zimmerman et al.: "Rubber Age," vol. 68, No. 3, pp. 311–318 (December 1950).

ALEXANDER H. BRODMERKEL, *Primary Examiner.*

ALPHONSO D. SULLIVAN, WILLIAM H. SHORT, MORRIS LIEBMAN, *Examiners.*